United States Patent
Hsu et al.

(10) Patent No.: US 8,477,776 B2
(45) Date of Patent: Jul. 2, 2013

(54) MODEM AND METHOD SUPPORTING VARIOUS PACKET CABLE PROTOCOLS

(75) Inventors: Lu-Meng Hsu, Taipei Hsien (TW); Yew-Min Lo, Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 334 days.

(21) Appl. No.: 12/909,795

(22) Filed: Oct. 21, 2010

(65) Prior Publication Data

US 2011/0182282 A1 Jul. 28, 2011

(30) Foreign Application Priority Data

Jan. 28, 2010 (CN) .......................... 2010 1 0300848

(51) Int. Cl.
*H04L 12/28* (2006.01)

(52) U.S. Cl.
USPC ........................... 370/389; 370/352; 370/357

(58) Field of Classification Search
USPC .................. 370/260, 350–356, 389; 473/465
See application file for complete search history.

(56) References Cited

U.S. PATENT DOCUMENTS

| | | | | |
|---|---|---|---|---|
| 7,046,659 | B1 * | 5/2006 | Woundy ........................ | 370/352 |
| 7,103,067 | B1 * | 9/2006 | Singh et al. ................... | 370/467 |
| 2002/0052927 | A1 * | 5/2002 | Park ............................. | 709/217 |
| 2002/0061012 | A1 * | 5/2002 | Thi et al. ....................... | 370/352 |
| 2003/0067927 | A1 * | 4/2003 | Nair et al. .................... | 370/401 |
| 2003/0219011 | A1 * | 11/2003 | Han ............................. | 370/352 |
| 2005/0031097 | A1 * | 2/2005 | Rabenko et al. ........... | 379/93.31 |
| 2005/0249196 | A1 * | 11/2005 | Ansari et al. ................. | 370/352 |
| 2006/0168162 | A1 * | 7/2006 | Woundy ....................... | 709/220 |
| 2006/0187957 | A1 * | 8/2006 | Devine et al. ............... | 370/466 |
| 2007/0121587 | A1 * | 5/2007 | Mundra et al. ............... | 370/352 |
| 2007/0133516 | A1 * | 6/2007 | Stein ............................ | 370/352 |
| 2008/0123627 | A1 * | 5/2008 | Moreman et al. ............. | 370/352 |
| 2009/0150954 | A1 * | 6/2009 | Kim et al. .................... | 725/111 |
| 2009/0238180 | A1 * | 9/2009 | Devine et al. ................ | 370/389 |
| 2009/0320077 | A1 * | 12/2009 | Gazdzinski .................... | 725/62 |
| 2010/0332680 | A1 * | 12/2010 | Anderson et al. ............ | 709/245 |
| 2011/0116419 | A1 * | 5/2011 | Cholas et al. ................ | 370/259 |
| 2011/0158239 | A1 * | 6/2011 | Mohaban ..................... | 370/392 |

* cited by examiner

*Primary Examiner* — Luat Phung
*Assistant Examiner* — Berhanu Belete
(74) *Attorney, Agent, or Firm* — Altis Law Group, Inc.

(57) ABSTRACT

A modem includes a communicating module, a multimedia terminal adapter (MTA) module, a parsing module, and a selecting module. The communicating module sends a configuration file request packet to a TFTP server to get configuration files including a file ID. The parsing module parses the configuration files to get the file ID. The selecting module configures the MTA module corresponding to the file ID. The communicating module further communicates with a VoIP network according to a protocol corresponding to the file ID.

2 Claims, 4 Drawing Sheets

MODEM AND METHOD SUPPORTING VARIOUS PACKET CABLE PROTOCOLS

BACKGROUND

1. Technical Field

Embodiments of the present disclosure relate to networking communication, and more particularly to a modem and method supporting various packet cable protocols.

2. Description of Related Art

In general, VoIP networks distributed in different areas employ different communication protocols, such as the media gateway control protocol (MGCP) or the session initiation protocol (SIP), to communicate. Modems in VoIP networks of different protocols would employ corresponding configuration files to match the communication protocols, such as packet cable 1.0 and 1.5 (short for PC1.X), or packet cable 2.0 (short for PC2.0). The PC1.X is a communication standard used MGCP as VoIP signaling protocol, and the PC2.0 is a communication standard used SIP as VoIP signaling protocol. In practical, the PC1.X matches MGCP and cannot match SIP, and the PC2.0 match SIP and cannot match MGCP. Therefore, in different areas, the modems should employ different communication standards for normal operation. The employed communication standards should be according to the protocol of the VoIP network.

Therefore, what is needed is a modem can employ different communication standards according to the protocol of the VoIP network.

BRIEF DESCRIPTION OF THE DRAWINGS

The details of the disclosure, both as to its structure and operation, can best be understood by referring to the accompanying drawings, in which like reference numbers and designations refer to like elements.

DETAILED DESCRIPTION

All of the processes described may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
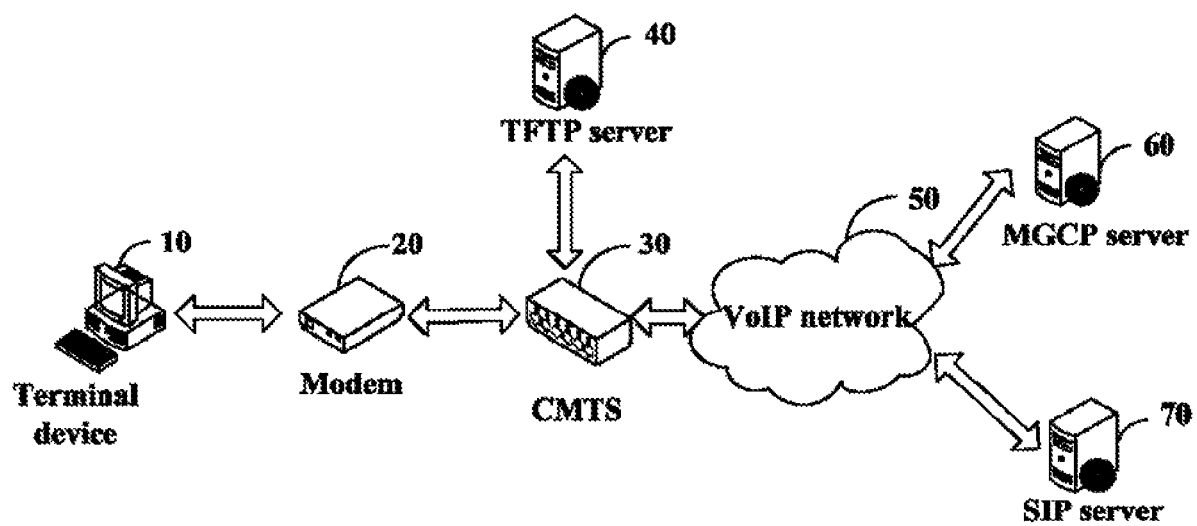
FIG. 1 shows an application environment of a modem of one embodiment of the present disclosure.

FIG. 1 shows an application environment of a modem 20 of one embodiment of the present disclosure. In one embodiment, a terminal device 10 connects to a VoIP network 50 by way of a modem 20 and a cable modem terminal system (CMTS) 30. If the terminal device 10 wants to communicate with other terminal devices in the VoIP network 50, the modem 20 connected to the terminal device 10 communicates with a trivial file transfer protocol (TFTP) server 40 to get configuration files complied with the VoIP network 50, and configures itself according to the configuration files. Then, the modem 20 can communicate the terminal device 10 with a media gateway control protocol (MGCP) server 60 or a session initiation protocol (SIP) server 70 on the VoIP network 50.

In one embodiment, the modem 20 can support various packet cable protocols, such as packet cable 1.0 or 1.5 (collectively PC1.X), and packet cable 2.0 (PC2.0), to accord with the communication protocols of different VoIP networks 50. In one embodiment, PC1.X is a communication standard used the MGCP as VoIP signaling protocol, and PC2.0 is a communication standard used the SIP as VoIP signaling protocol. The TFTP server 40 stores all types of configuration files of the PC1.X and the PC2.0.

In one embodiment, the modem 20 gets the configuration files from the TFTP server 40, and communicates with the MGCP server 60 and the SIP server 70 over the VoIP network 50.

Figure 2:
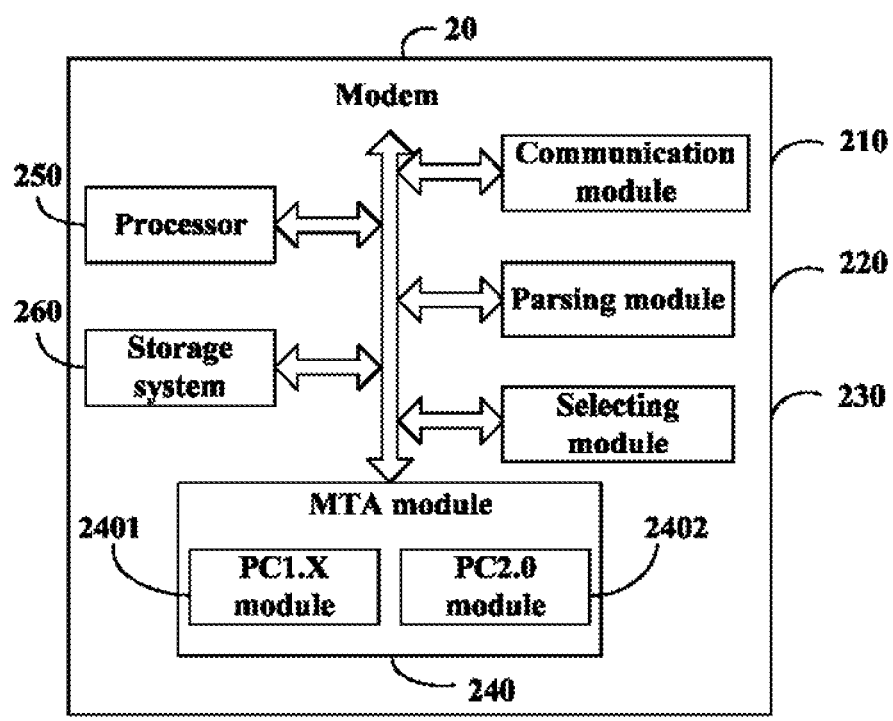
FIG. 2 shows a schematic diagram of functional modules of the modem of one embodiment of the present disclosure.

FIG. 2 shows a schematic diagram of functional modules of the modem 20 of one embodiment of the present disclosure. In one embodiment, the modem 20 includes a communication module 210, a parsing module 220, a selecting module 230, a multimedia terminal adapter (MTA) module 240, at least one processor 250, and a storage system 260. The modules 210-240 may comprise computerized code in the form of one or more programs that are stored in the storage system 260 (or memory). The computerized code includes instructions that are executed by the at least one processor 250 to provide functions for modules 210-240.

The MGCP server 60 and the SIP server 70 each have a service identification (ID). In one embodiment, the service ID of the MGCP server 60 is a media access control (MAC) address of the MGCP server 60, and the service ID of the SIP server 70 is a MAC address of the SIP server 70.

In one embodiment, the communication module 210 sends a configuration file requesting packet to the TFTP server 40 for suitable configuration files when the terminal device 10 wants to communicate with other terminal devices on the VoIP network 50. Then, the TFTP server 40 feeds back the configuration files to the communication module 210 after receiving the configuration file requesting packet. In one embodiment, the configuration files comprise a file identification (ID). In one embodiment, if the modem 20 is in a VoIP network according with the MGCP, the file ID of the configuration files fed back by the TFTP server 40 is the service ID of the MGCP server 60. If the modem 20 is in a VoIP network according with the SIP, the file ID of the configuration files fed back by the TFTP server 40 is the service ID of the SIP server 70.

The parsing module 220 parses the configuration files to obtain the file ID. Then the selecting module 230 configures the MTA module 240 according to the file ID of the configuration files. In one embodiment, the MTA module 240 includes a PC1.X module 2401 and a PC2.0 module 2402. The PC1.X module 2401 is operable to establish a connection between the modem 20 and the MGCP server 60 with PC1.X, and the PC2.0 module 2402 is operable to establish a connection between the modem 20 and the SIP server 70 with PC2.0.

The parsing module 220 determines if the file ID of the configuration files is the service ID of the MGCP server 60. In the embodiment, the communication device 10 communicates with other terminal devices on the VoIP network 50 according to MGCP if the file ID of the configuration files is the service ID of the MGCP server 60. In this situation, the selecting module 230 configures the PC1.X module 2401 according to the configure files. In one embodiment, the communication module 210 communicates with the MGCP server 60 over the VoIP network 50 according to MGCP.

If the file ID of the configuration file is not the service ID of the MGCP server 60, the parsing module 220 determines if the file ID of the configuration file is service ID of the SIP server 70. In the embodiment, the communication device 10 communicates with other terminal devices in the VoIP network 50 according to SIP if the file ID of the configuration files is the service ID of the SIP server 70. In this situation, the selecting module 230 configures the PC2.0 module 2402 according to the configure files. In one embodiment, the communication module 210 communicates with the SIP server 70 over the VoIP network 50 according to SIP.

In this disclosure, the modem 20 receives the configuration files, and parses the configuration files to obtain the file ID of the configuration files, then determines the file ID of the configuration files to obtain the communication protocol, and configures the MTA module 240 according to the communication protocol and the configuration files. Therefore, no matter where the modem 20 is, the modem 20 can use the configuration files in the TFTP server 40 to communicate with the VoIP network 50.

Figure 3:
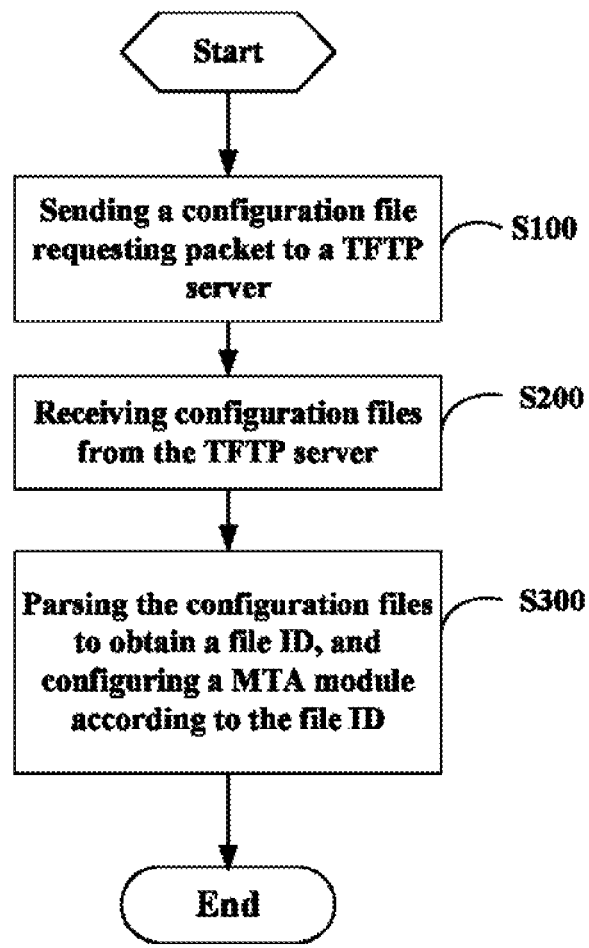
FIG. 3 is a flowchart of various packet cable protocols supporting method of one embodiment in accordance with the present disclosure.

FIG. 3 is a flowchart of various packet cable protocols supporting method of one embodiment in accordance with the present disclosure. The method is applied in a modem, such as that of FIG. 1, and is executed by functional modules such as those of FIG. 2. Depending on the embodiment, additional blocks may be added, others deleted, and the ordering of blocks may be changed while remaining well within the scope of the disclosure.

In block S100, the communication module 210 sends a configuration file requesting packet to the TFTP server 40 for suitable configuration files when the communication terminal 10 wants to communicate with other terminal devices on the VoIP network 50.

In block S200, the communication module 210 receives the configuration files fed back by the TFTP server 40. In one embodiment, the configuration files comprise a file identification (ID). In one embodiment, if the modem 20 is in a VoIP network according with the MGCP, the file ID of the configuration files fed back by the TFTP server 40 is the service ID of the MGCP server 60. If the modem 20 is in a VoIP network according with the SIP, the file ID of the configuration files fed back by the TFTP server 40 is the service ID of the SIP server 70.

In block S300, the parsing module 220 parses the configuration files to obtain the file ID. Then the selecting module 230 configures the MTA module 240 according to file ID of the configuration files. In one embodiment, the MTA module 240 includes a PC1.X module 2401 and a PC2.0 module 2402. The PC1.X module 2401 is operable to establish a connection between the modem 20 and the MGCP server 60 with PC1.X, and the PC2.0 module 2402 is operable to establish a connection between the modem 20 and the SIP server 70 with PC2.0.

Figure 4:
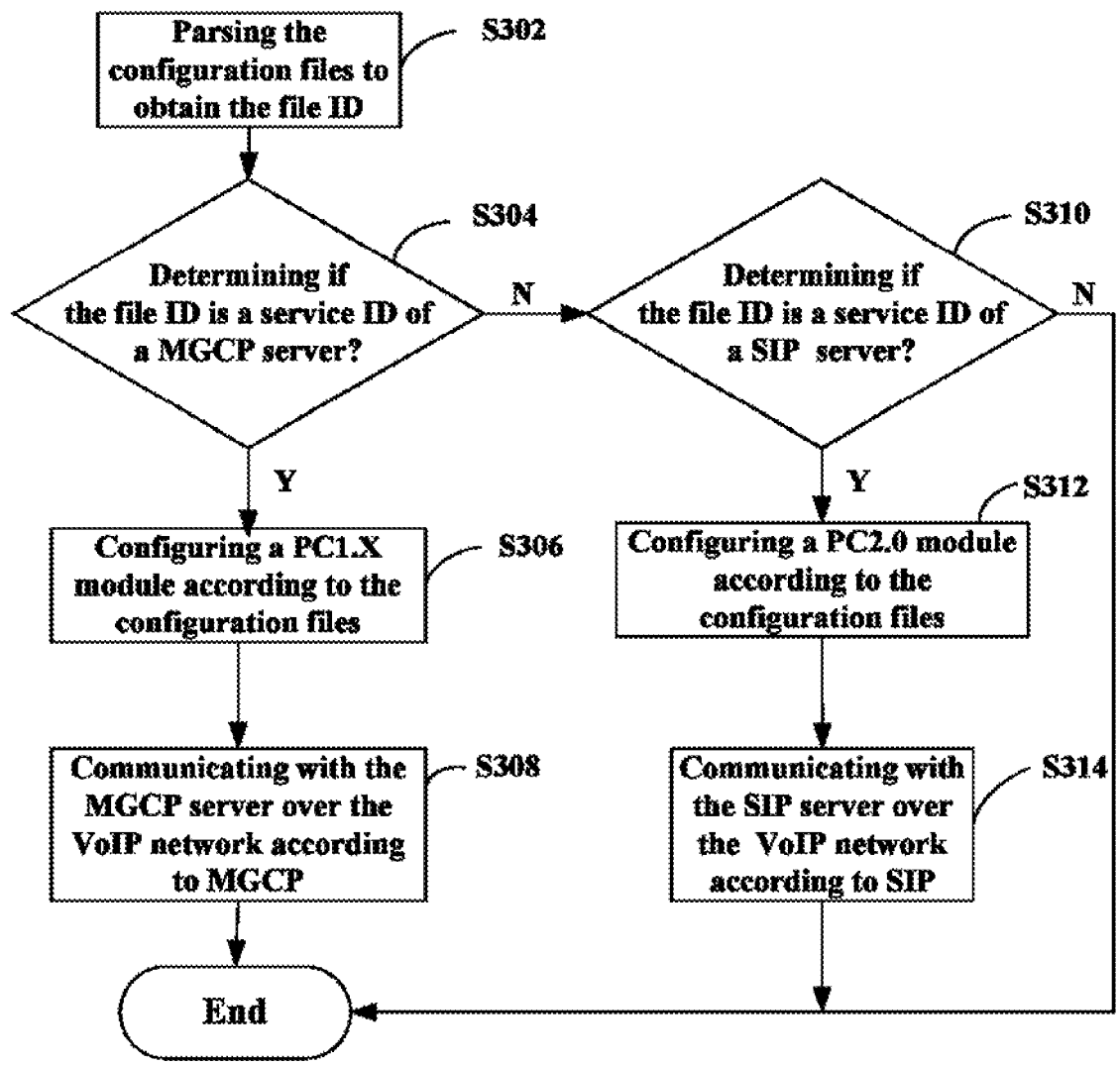
FIG. 4 is a flowchart of configuring a multimedia terminal adapter (MTA) module in the FIG. 3 of one embodiment of the present disclosure.

FIG. 4 is a flowchart of configuring multimedia terminal adapter (MTA) module (block S300) in the FIG. 3 of one embodiment of the present disclosure. In one embodiment, the configuration files comprise a file identification (ID).

In one embodiment, the service ID of the MGCP server 60 is a media access control (MAC) address of the MGCP server 60, and the service ID of the SIP server 70 is a MAC address of the SIP server 70.

In block S302, the parsing module 220 parses the configuration files to obtain the file ID.

In block S304, the parsing module 220 determines if the file ID of the configuration files is the service ID of the MGCP server 60. In the embodiment, the file ID of the configuration files is the service ID of the MGCP server 60 if the communication protocol of the configuration files is MGCP, the file ID of the configuration files is the service ID of the SIP server 70 if the communication protocol of the configuration files is SIP.

If the file ID of the configuration files is the service ID of the MGCP server 60, then in block S306, the selecting module 230 configures the PC1.X module 2401 according to the configuration files.

In block S308, the communication module 210 communicates with the MGCP server 60 over the VoIP network 50 according to MGCP.

If the file ID of the configuration files is not the service ID of the MGCP server 60, then in block S310, the parsing module 220 determines if the file ID of the configuration files is the service ID of the SIP server 70.

If the file ID of the configuration files is the service ID of the SIP server 70, then in block S312, the selecting module 230 configures the PC2.0 module 2402 according to the configuration files.

In block S314, the communication module 210 communicates with the SIP server 70 over the VoIP network 50 according to SIP.

In this disclosure, the modem 20 and various packet cable protocols supporting method disclosed that the modem 20 receives the configuration files, and parses the configuration files to obtain the file ID, then selects the PC1.X module 2401 or the PC2.0 module 2402 according to the file ID, and configures the MTA module 240 according to the configuration files. Thus, the modem 20 in VoIP networks 50 of different protocols would employ corresponding configuration files to match the communication protocols, such as the PC1.X or the PC2.0, then the modem 20 communicates with different devices in the VoIP network 50.

While various embodiments and methods of the present disclosure have been described above, it should be understood that they have been presented by way of example only and not by way of limitation. Thus, the breadth and scope of the present disclosure should not be limited by the above-described exemplary embodiments, but should be defined only in accordance with the following claims and their equivalents.

What is claimed is:

1. A modem to communicate with a session initiation protocol (SIP) server, a media gateway control protocol (MGCP) server and a trivial file transfer protocol (TFTP) server, the modem comprising a processor, a storage system, and one or more programs, wherein the one or more programs are stored in the storage system and operable to be executed by the processor, and the SIP server and the MGCP server respectively have a service identification (ID), the modem further comprising:

a multimedia terminal adapter (MTA) module comprising a packet cable 1.X (PC1.X) module and a packet cable 2.0 (PC2.0) module, wherein the packet cable 1.X (PC1.X) module is operable to establish a connection between the modem and the MGCP server with PC1.X, the PC1.X is a communication standard that uses MGCP as VoIP signaling protocol;

a communication module operable to send a configuration file requesting packet to the TFTP server and receive configuration files fed back by the TFTP server, wherein the configuration files comprise a file identification (ID);

a parsing module operable to parse the configuration files to obtain the file ID; and a selecting module operable to configure the MTA module according to the file ID, wherein the selecting module configures the PC2.0 module upon the condition that the file ID is the service ID of the SIP server, and configures the PC1.X module when the file ID is the service ID of the MGCP server.

2. A method of a modem supporting various packet cable protocols, wherein the modem comprises a multimedia terminal adapter (MTA) module to communicate with session initiation protocol (SIP) server, a media gateway control protocol (MGCP) server and a trivial file transfer protocol (TFTP) server, the SIP server and the MGCP server respectively have a service identification (ID), the method comprising:

sending a configuration file requesting packet to the TFTP server;

receiving configuration files fed back by the TFTP server, wherein the configuration files comprise a file identification (ID);

parsing the configuration files to obtain the file ID; and configuring the MTA module according to the file ID, wherein the MTA module includes a packet cable 1.X (PC1.X) module and a packet cable 2.0 (PC2.0) module, wherein the packet cable 1.X (PC1.X) module is operable to establish a connection between the modem and the MGCP server with PC1.X, the PC1.X is a communication standard that uses MGCP as VoIP signaling protocol, if the file ID is the service ID of the SIP server, then the PC2.0 module is configured, if the file ID is the service ID of the MGCP server, then the PC1.X module is configured.

* * * * *